United States Patent Office 3,754,086
Patented Aug. 21, 1973

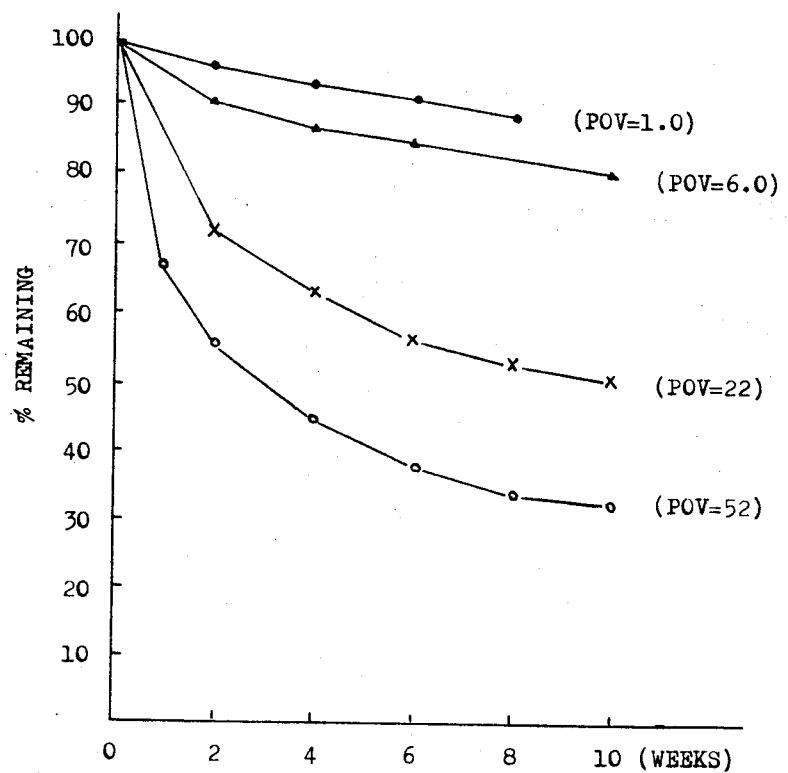

3,754,086
STABLE OILY PREPARATIONS OF
EPITHIO-STEROIDS
Shokei Fujisawa, Itamishi, Japan, assignor to
Shionogi & Co., Ltd., Osaka, Japan
Filed June 7, 1971, Ser. No. 150,529
Claims priority, application Japan, June 8, 1970,
45/49,279, 45/49,280
Int. Cl. C07c 173/00
U.S. Cl. 424—241
35 Claims

ABSTRACT OF THE DISCLOSURE

Stable oily preparations of eipthio-steroids useful as a pharmaceutical or veterinary medicine in their strong anti-progestational, anti-estrogenic myogenic, anti-lipeamic, androgenic, and other hormonal activities are prepared by adding an epithio-steroid to an oil having a low peroxide value.

---

This invention relates to stable oily preparations of epithio-steroids and to a process for preparing the same. The oily preparations of epithio-steroids comprise essentially an epithio-steroid and an oil having a low peroxide value (the peroxide value hereinafter referred to as POV represents amount in mg. of active oxygen in 100 g. of oil). Said preparations can be prepared by adding an epithio-steroid to an oil having a low POV. The preparations of the present invention are useful as a pharmaceutical or veterinary medicament, because they show strong anti-progestational, anti-astrogenic, myogenic, anti-lipeamic, androgenic, or other hormonal activity.

The epithio-steroids available in the present invention are androstane, pregnane, estrane, cholane, cholestane and other similar steroids, having an epithio group at the position 1,2; 2,3; 3,4; 4,5; 5,6; 6,7; 11,12; 14,15; 15,16; or 16,17 of the steroid nucleus. Although the epithio-steroids, e.g. $2\alpha,3\alpha$-epithio-androstan-17$\beta$-ols show strong anabolic, anti-estrogenic, and anti-fertility activities [tetrahedron, 21, 329 (1965)], their practical uses are considerably limited, because they cannot be stored for a long time. The same is substantially true for other epithio-steroids. It is believed that such instability was probably due to less resistance of the epithio group to acids at the position $2\alpha,3\alpha$ of the steroid nucleus. During the course of investigation on an oily preparation, the present inventor found that the stability of an epithio-steroid in oil greatly depends on the lot number of the preparation. As the result of various studies, it has been confirmed that the epithio-steroid contained therein is decomposed by the action of peroxides in the oil used. Usually, oils in market have a variety of high POV of 3-8, and their POV turns to higher than 100 by the autoxidation after exposed to air for a long time. It is therefore very much difficult to prepare a stable and long-acting preparation of said epithio-steroid by using an oil having a high POV. In this connection, the present inventor has succeeded in reducing a high POV to a low one by treating the oil with an active adsorbent. Thus, stable oily preparations of the epithio-steroids can be prepared by using an oil having a low POV. The present invention has been completed on the basis of these observations.

As mentioned above, the epithio-steroids available in this invention are androstane, estrane, pregnane, cholane, cholestane, and other similar steroids, having an epithio group at the position 1,2; 2,3; 3,4; 4,5; 5,6; 6,7; 11,12; 14,15; 15,16, or 16,17 of the steroid nucleus. These epithio-steroids may have substituent(s) such as lower alkyl, lower alkenyl, acyloxy, alkoxycycloalkyloxy, cycloalkenyloxy, hydroxy, oxo, ketal, carboxyl, ester, halogen, or unsaturated double bond; and they may further include nor- or homo-derivative thereof. Typical examples of said epithio-steroid are as follows:

$2\alpha,3\alpha$-epithio-5$\alpha$-pregnane,
$2\alpha,3\alpha$-epithio-5$\alpha$-estrane,
$2\alpha,3\alpha$-epithio-5$\beta$-cholane,
$2\alpha,3\alpha$-epithio-5$\beta$-cholanic acid methyl ester,
$2\alpha,3\alpha$-epithio-5$\alpha$-chloestane,
$2\beta,3\beta$-epithio-5$\alpha$-androstan-17$\beta$-ol,
$2\alpha,3\alpha$-epithio-5$\alpha$-androstan-17$\beta$-ol,
$2\alpha,3\alpha$-epithio-5$\alpha$-androstan-17$\beta$-ol acetate,
$2\alpha,3\alpha$-epithio-5$\alpha$-androstan-17$\beta$-ol propionate,
$2\alpha,3\alpha$-epithio-5$\alpha$-androstan-17$\beta$-ol valerate,
$2\alpha,3\alpha$-epithio-5$\alpha$-androstan-17$\beta$-ol caprylate,
$2\alpha,3\alpha$-epithio-5$\alpha$-androstan-17$\beta$-ol enanthate,
$2\alpha,3\alpha$-epithio-5$\alpha$-androstan-17$\beta$-ol phenylpropionate,
$2\alpha,3\alpha$-epithio-5$\alpha$-androstan-17$\beta$-ol benzoate,
$2\alpha,3\alpha$-epithio-2$\beta$-methyl-5$\alpha$-androstane,
$2\alpha,3\alpha$-epithio-1$\alpha$-methyl-5$\alpha$-androstan-17$\beta$-ol,
$2\beta,3\beta$-epithio-1$\alpha$-methyl-5$\alpha$-androstan-17$\beta$-ol,
$2\alpha,3\alpha$-epithio-1$\alpha$-methyl-5$\alpha$-androstan-17$\beta$-ol acetate,
$2\alpha,3\alpha$-epithio-3$\beta$-methyl-5$\alpha$-androstan-17$\beta$-ol,
$2\alpha,3\alpha$-epithio-7$\alpha$-methyl-5$\alpha$-androstan-17$\beta$-ol,
$2\alpha,3\alpha$-epithio-8$\beta$-methyl-5$\alpha$-androstan-17$\beta$-ol,
$2\alpha,3\alpha$-epithio-17$\alpha$-methyl-5$\alpha$-androstan-17$\beta$-ol,
$2\alpha,3\alpha$-epithio-17$\alpha$-ethyl-5$\alpha$-androstan-17$\beta$-ol,
$2\alpha,3\alpha$-epithio-17$\alpha$-vinyl-5$\alpha$-androstan-17$\beta$-ol,
$2\alpha,3\alpha$-epithio-17$\alpha$-ethynyl-5$\alpha$-androstan-17$\beta$-ol,
$2\alpha,3\alpha$-epithio-18-methyl-5$\alpha$-androstan-17$\beta$-ol,
$2\alpha,3\alpha$-epithio-17-methylene-5$\alpha$-androstane,
$2\alpha,3\alpha$-epithio-5$\alpha$-androstane-7$\alpha,17\beta$-diol,
$2\alpha,3\alpha$-epithio-5$\alpha$-androstane-6$\beta,17\beta$-diol,
$2\alpha,3\alpha$-epithio-17$\beta$-(1-cyclopentenyl)oxy-5$\alpha$-androstane,
$2\alpha,3\alpha$-epithio-17$\beta$-(1-cyclohexenyl)oxy-5$\alpha$-androstane,
$2\alpha,3\alpha$-epithio-17$\beta$-(1-methoxycyclopentyl)oxy-5$\alpha$-
androstane,
$2\alpha,3\alpha$-epithio-17$\beta$-(1-methoxycyclohexyl)oxy-5$\alpha$-
androstane,
$2\alpha,3\alpha$-epithio-17$\beta$-(1-methoxycycloheptyl)oxy-5$\alpha$-
androstane,
$2\alpha,3\alpha$-epithio-17$\beta$-(1-ethoxycyclopentyl)oxy-5$\alpha$-
androstane,
$2\alpha,3\alpha$-epithio-17$\beta$-(1-ethoxycyclohexyl)oxy-5$\alpha$-
androstane,
$2\alpha,3\alpha$-epithio-5$\alpha$-androstan-17-one,
$1\alpha,2\alpha$-epithio-A-nor-5$\alpha$-androstan-17$\beta$-ol,
$2\alpha,3\alpha$-epithio-17-methyl-D-homo-5$\alpha$-androstan-17$\beta$-ol,
$3\beta,4\beta$-epithio-5$\alpha$-androstan-17$\beta$-ol,
$2\alpha,3\alpha$-epithio-5$\alpha$-androst-9(11)-en-17$\beta$-ol,
$2\alpha,3\alpha$-epithio-5$\alpha$-androst-6-en-17$\beta$-ol,
$2\alpha,3\alpha$-epithio-5$\alpha$-androst-6-en-17$\beta$-ol acetate,
$16\beta,17\beta$-epithio-4-androsten-3-one,
$2\alpha,3\alpha$-epithio-5$\alpha$-estran-17$\beta$-ol,
$2\beta,3\beta$-epithio-5$\alpha$-estran-17$\beta$-ol acetate,
$2\alpha,3\alpha$-epithio-5$\alpha$-pregnan-20-one,
$2\alpha,3\alpha$-epithio-11,20-dioxo-17$\alpha$-acetyloxy-5$\alpha$-pregnane,
$2\alpha,3\alpha$-epithio-11,20-dioxo-17$\alpha$-hydroxy-5$\alpha$-pregnane,
$2\alpha,3\alpha$-epithio-17$\alpha$-acetyloxy-5$\alpha$-pregnan-20-one,
$2\alpha3\alpha$-epithio-17$\alpha,21$-dihydroxy-5$\alpha$-pregnan-11,20-dione,
$2\alpha,3\alpha$-epithio-21-acetyloxy-17$\alpha$-hydroxy-5$\alpha$-pregnane-
11,20-dione,
$2\alpha3\alpha$-epithio-17$\alpha,21$-dihydroxy-5$\alpha$-pregnane-11,20-dione,
$2\alpha,3\alpha$-epithio-9$\alpha$-fluoro-11$\beta,17\alpha$-dihydroxy-5$\alpha$-pregnan-
20-one,
$11\alpha,12\alpha$-epithio-5$\alpha$-pregnane-3$\beta,20\alpha$-diol and
$14\beta,15\beta$-epithio-3$\beta$-hydroxy-5$\beta,14\beta$-card-20(22)-enolide.

They can be prepared according to the methods described as in Tetrahedron, 21, 329 (1965) and Ann. Rept. Shionogi Res. Lab., 19, 1–19 (1969).

The oils in this invention are derived from those of animal, vegetable, and/or synthetic sources commercially available to make many oily preparations. As example of the oils are vegetable oils (e.g. sesame oil, olive oil, cottonseed oil, corn oil, peanut oil, castor oil, wheat germ oil, rice-bran oil, palm oil, sunflowerseed oil, linseed oil, soya bean oil), alkyl esters of fatty acids wherein the alkyl moiety contains up to 10 carbon atoms, and the fatty acid contains 6–18 carbon atoms (e.g. methyl laurate, ethyl laurate, isopropyl laurate, butyl laurate, methyl myristate, ethyl myristate, isopropyl myristate, butyl myristate, isopropyl palmitate, butyl palmitate, amyl palmitate, isopropyl stearate, butyl stearate, decyl oleate, diisopropyl adipate), glycerides of fatty acids wherein the fatty acid contains 8–10 carbon atoms (e.g. glyceryl monocaprylate, glyceryl dicaprylate, glycerely tricaprylate, glyceryl monoperalgonate, glyceryl diperalgonate, glyceryl triperalgonate, glyceryl monocaprate, glyceryl dicaprate, glyceryl tricaprate) and mixture thereof, among which sesame oil is the most preferable one. The oils available in this invention must have a low POV, preferably 0–2.5. As mentioned above, the oils in market usually have a high POV of 3–8, and it is therefore necessary to reduce the POV to a low one within a POV range of 0–2.5, before use. For this purpose, the oils having a high POV are treated with an adsorbent (e.g. activated clay, acid clay, activated terra abla, acid terra abla, alumina, silica gel, talc, activated carbon). Among them the clay is most preferably employed. More particularly, the desired oil having a preferable POV can be prepared by mixing together said oil and said adsorbent in an inert atmosphere such as nitrogen or helium, and filtering the resulting mixture. The treatment with the adsorbent is carried out at room temperature preferably for 0.5–2 hours, or if necessary, by gentle heating (about 40–70° C.), where the preferable amount of adsorbent is 5–15 w./w. percent of the oil. The oil thus obtained is to have a low POV of 0–2.5. The POV was determined by iodometric titration where potassium iodide was added to the oil, and the liberated iodine was titrated with sodium thiosulfate reagent.

According to the present invention, the stable oily preparations of the epithio-steroids can be prepared simply by dissolving said steroid in an oil having a low POV at about room temperature, or if necessary, by gentle heating (about 40–70° C.). It is preferred to effect the procedure in an inert atmosphere, particularly a non-oxidative atmosphere such as nitrogen or helium. The preparations so stabilized can be stored for extended period without appreciable loss of their bio-activity.

For example, the figure shows the influence of peroxide in 4 types of sesame oil on the stability of $2\alpha,3\alpha$-epithio-$5\alpha$-androstan-$17\beta$-ol at 60° C. It is apparently shown that the preparation of this invention using sesame oil having a low POV (1.0) is distinctly more stable during longer period than that prepared by the use of commercial sesame oil having a higher POV.

The preparations of the present invention are preferably used in the dosage form of injections, and they may be applied to other conventional dosage forms such as capsules or the like, by using the present inventive conception and modes known to those skilled in the art. They may contain suitable antiseptics, bacteriostats, and/or preservatives. The preparations may be used for the treatment of malnutrition, recovery from emaciation, convalescence, senility, wasting diseases, and disorders of nutrition, promotion of growth of immature infant, promotion of granulation and protein metabolism, increase in body weight, stimulation of apetite, and for the treatment of diseases or conditions demanding anabolic agents, or for implantation inhibition, mastopathy, mammary cancer, endometriosis, regulation of conception, corpulency, etc., to humans, and/or veterinary, and poultry uses. They can be administered orally or parenterally in the aforementioned dosage form, where the active epithio-steroid is contained in such amounts as to permit a dosage of 1γ to 500 mg. per kg. of body weight for a day. The administration is as often as required by the physicians' or veterinary indication.

The following examples are given only by way of illustration and are not intended as limitations of the present invention, many apparent variations of which are possible without departing from the spirit and scope thereof.

In the working examples, the amount of remaining epithio-steroid was determined in the following method. Two-ml. of the solution (1%) was pipetted into a 20-ml. messflask and diluted with ethyl ether-ether (1:1 by volume). To a 5-ml. aliquot of the diluted solution was added 10 ml. of 0.004 M mercuric acetate. After the mixture was allowed to stand for 4 minutes with occasional stirring, 10 ml. of 0.01 N hydrochloric acid was added and the mixture was titrated potentiometrically with 0.002 M mercuric acetate. Titration was carried out along with a blank run concurrently.

EXAMPLE 1

$2\alpha,3\alpha$-epithio-$5\alpha$-androstan-$17\beta$-ol (1 g.) is dissolved in a treated sesame oil (80 ml., POV=0.4) at 40–50° C. and the solution is cooled to room temperature. An additional quantity of the sesame oil is added to the solution to make a total volume of 100 ml. After the oily solution is submitted to bacterial filtration, the resulting solution is aseptically subdivided and poured into ampules in a nitrogen stream.

The amount of remaining epithio-steroid in the preparation steroid for a fixed period at room temperature was determined as shown below.

| Month: | Percent remaining |
| --- | --- |
| 6 | 96.3 |
| 12 | 95.8 |
| 18 | 95.3 |
| 24 | 94.6 |

On the contary, the amount of remaining epithio-steroid in the preparation obtained by using a commercial sesame oil (POV=6.0) was 89.6% after 14 weeks storage under the same condition.

In the same manner by using treated peanut oil (POV=0.4), cottonseed oil (POV=0.5), corn oil (POV=0.8), olive oil (POV=0.4), castor oil (POV=1.0), glyceryl monocaprylate (POV=0.1), and isopropyl myristate (POV=0.1) in place of the sesame oil, stable oily preparations are respectively obtained.

EXAMPLE 2

$2\alpha,3\alpha$-epithio-$5\alpha$-androstan-$17\beta$-ol propionate (2 g.) is dissolved in a purified sesame oil (80 ml., POV=0.1) while gentle heating (about 40–50° C.), and then the solution is cooled to room temperature. An additional quantity of the sesame oil is added to the solution to make a total volume of 100 ml. After the mixture is submitted to bacterial filtration, the filtrate is aseptically subdivided and poured into ampules in a nitrogen stream. Thus, the desired preparation is obtained. The amount of remaining epithio-steroid in the preparation stored for a fixed period at room temperature is shown below.

| Month: | Percent remaining |
| --- | --- |
| 2 | 97.0 |
| 6 | 97.3 |
| 13 | 97.5 |
| 18 | 95.2 |

Further, the amount of remaining steroid in the preparation prepared in the same manner as above, but by using the purified sesame oil (POV=2.2) in place of the sesame oil having a POV of 0.1, was 96.3%, 96.0%, and 93.5% respectively after 4, 12 and 24 months storage.

To the contrary, when a preparation comprising said epithio-steroid and another lot of sesame oil (POV=6.0) was stored for comparison at room temperature for 14 weeks, the amount of remaining steroid was 90%.

EXAMPLE 3

2α,3α - epithio - 17β - (1-methoxycyclopentyl)oxy-5α-androstane (1 g.) is dissolved in a treated sesame oil (80 ml., POV=0.4) at 40–50° C. and the solution is cooled to room temperature. An additional qauntity of the sesame oil is added to the solution to make a total volume of 100 ml. The solution is submitted to bacterial filtration, and the filtrate is aseptically subdivided and poured into ampules in a nitrogen stream.

The potency of the epithio-steroid in the preparation remains unchanged even after 6 months storage.

EXAMPLE 4

2α,3α-epithio-5α-androstan-17β-ol enanthate (5 g.) is dissolved in a purified sesame oil (80 ml., POV=0.2) by gentle heating (40–50° C.) and the solution is cooled to room temperature. An additional quantity of the sesame oil is added to the solution to make a total volume of 100 ml. The mixture is submitted to bacterial filtration and the filtrate is aseptically subdivided and poured into ampules in a nitrogen stream. The oily preparation thus obtained is stable for rather longer period.

EXAMPLE 5

2α,3α-epithio-17α-methyl-5α-androstan-17β-ol (1 g.) is dissolved in a sesame oil (80 ml., POV=0.4) at 40–50° C. and the solution is cooled to room temperature. An additional quantity of the sesame oil is added to the solution to make a total volume of 100 ml. The solution is submitted to bacterial filtration, and the resulting solution is aseptically subdivided and poured into ampules in a nitrogen stream.

The epithio-steroid in the preparation is stable during extended period.

EXAMPLE 6

2α,3α-epithio-17,21-dihydroxy-5α-pregnane-11,20-dione (1 g.) is dissolved in a kind of sesame oil (80 ml., POV=0.4) at 40–50° C. and the solution is cooled to room temperature. An additional quantity of the sesame oil is added to the solution to make a total volume of 100 ml. The solution is submitted to bacterial filtration, and the resulting solution is aseptically subdivided and poured into ampules in a nitrogen stream.

The epithio-steroid in the preparation is very stable and durable for extended period.

EXAMPLE 7

2α,3α-epithio-11,20-dioxo-17α-acetyloxy-5α-pregnane (1 g.) is dissolved in a treated sesame oil (80 ml., POV=0.4) at 40–50° C. and the oily solution is cooled to room temperature. An additional quantity of the sesame oil is added to the solution to make a total volume of 100 ml. The solution is submitted to bacterial filtration, and the filtrate is aseptically subdivided and poured into ampules in a nitrogen stream.

The epithio-steroid in the preparation is very stable for a longer term.

EXAMPLE 8

2α,3α-epithio-5α-androst-6-en-17β-ol (1 g.) is dissolved in a purified sesame oil (80 ml., POV=0.4) at 40–50° C. and the solution is cooled to room temperature. An additional quantity of the sesame oil is added to the solution to make a total volume of 100 ml. The solution is submitted to bacterial filtration, and the resulting solution is aseptically subdivided and poured into ampules in a nitrogen stream.

The epithio-steroid in the preparation is very durable for extended period.

In the same manner as above, but using other epithio-steroids as hereinbefore disclosed, corresponding stable and durable preparations are obtained.

EXAMPLE 9

A sesame oil (20 g., POV=5.96) is placed in a 100-ml. four necked flask and to this is added activated clay (2.0 g.). The mixture is stirred at room temperature for 2 hours in a nitrogen stream and then filtered. The POV of the resulting oil is found to be 0.04. When the treatment is performed at 40° C., 60° C., or 70° C. in the same manner as above, the POV of the resulting oil is found respectively to be 0.05, 0.02, or 0.03.

An oil having a low POV is prepared in the same manner as above, using cottonseed oil, olive oil, peanut oil, corn oil, castor oil, glyceryl monocaprylate, or isopropyl myristate in place of the sesame oil.

EXAMPLE 10

A commercial sesame oil (20 g., POV=7.38) is placed in a 100-ml. four necked flask and to this is added activated clay (2.0 g.). The mixture is stirred at 70° C. for 30 minutes in a nitrogen stream and filtered. The POV of the oil thus obtained is found to be 0.07.

When the treatment is performed for 1, 1.5 or 20 hours, the respective POV of the resulting oils is found to be 0.07, 0.03 or 0.06.

EXAMPLE 11

A sesame oil (20 g., POV=7.74) is placed in a 100-ml. four necked flask and to this is added activated clay (1.0 g.). The mixture is stirred at 70° C. for one hour in a nitrogen stream and filtered. The POV of the oil thus obtained is found to be 0.06.

When the treatment is performed using 2.0 g. or 3.0 g. of the sesame oil in the same manner as above, the POV of the resulting oils is found respectively to be 0.07 or 0.

EXAMPLE 12

A commercial sesame oil (20 g., POV=5.10) is placed in a 100-ml. four necked flask and to this is added acid clay (2.0 g.). The mixture is heated at 70° C. for 1.5 hours with stirring in a nitrogen stream, and filtered. The POV of the resulting oil is found to be 0.4.

EXAMPLE 13

Sesame oil having a low POV is prepared by the treatment with alumina in the same manner as that in Example 10.

EXAMPLE 14

A solution in oil for intramuscular injection, composed of 10 mg. of 2α,3α-epithio-17β-(1-methoxycyclopentyl)oxy-5α-androstane in 1 ml. of sesame oil having a low peroxide value is prepared according to the method as in Example 3 and administered once or twice a week to a patient, e.g. a woman in childbed.

EXAMPLE 15

A capsule, containing a solution of 2.5 mg. of 2α,3α-epithio-(1-ethoxycyclopentyl)oxy-5α-androstane in 0.25 ml. of sesame oil having a low peroxide value is given orally three times a day to a patient who is suffering e.g. from malnutrition.

What we claim is:

1. An oily preparation comprising essentially an epithio-steroid that decomposes by the action of peroxide in oils which undergo autoxidation after exposure to air and an oil having a low peroxide value as stabilizer therefor.

2. An oily preparation according to claim 1, wherein the oil has a peroxide value of 0–2.5.

3. An oily preparation according to claim 1, wherein the epithio-steroid is a member selected from the group consisting of androstane, pregnane, estrane, cholane, and cholestane, having an epithio group at position 1,2; 2,3; 3,4; 4,5; 5,6; 6,7; 11,12; 14,15; 15,16; or 16,17 of the steroid nucleus and having optional and intact substituent(s) selected from the group consisting of lower alkyl, lower alkenyl, acyloxy, alkoxycycloalkyloxy cycloalkenyloxy, hydroxy, oxo, ketal, carboxyl, ester, halogen, and unsaturated double bond.

4. An oily preparation according to claim 1, wherein the epithio-steroid is a 2α,3α-epithio-steroid.

5. An oily preparation according to claim 1, wherein the epithio-steroid is a member selected from the group consisting of:

2α,3α-epithio-5α-pregnane,
2α,3α-epithio-5α-estrane,
2α,3α-epithio-5β-cholane,
2α,3α-epithio-5β-cholanic acid methyl ester,
2α,3α-epithio-5α-cholestane,
2β,3β-epithio-5α-androstan-17β-ol,
2α,3α-epithio-5α-androstan-17β-ol,
2α,3α-epithio-5α-androstan-17β-ol acetate,
2α,3α-epithio-5α-androstan-17β-ol propionate,
2α,3α-epithio-5α-androstan-17β-ol valerate,
2α,3α-epithio-5α-androstan-17β-ol caprylate,
2α,3α-epithio-5α-androstan-17β-ol enanthate,
2α,3α-epithio-5α-androstan-17β-ol phenylpropionate,
2α,3α-epithio-5α-androstan-17β-ol benzoate,
2α,3α-epithio-2β-methyl-5α-androstane,
2α,3α-epithio-1α-methyl-5α-androstan-17β-ol,
2β,3β-epithio-1α-methyl-5α-androstan-17β-ol,
2α,3α-epithio-1α-methyl-5α-androstan-17β-ol acetate,
2α,3α-epithio-3β-methyl-5α-androstan-17β-ol,
2α,3α-epithio-7α-methyl-5α-androstan-17β-ol,
2α,3α-epithio-8β-methyl-5α-androstan-17β-ol,
2α,3α-epithio-17α-methyl-5α-androstan-17β-ol,
2α,3α-epithio-17α-ethyl-5α-androstan-17β-ol,
2α,3α-epithio-17α-vinyl-5α-androstan-17β-ol,
2α,3α-epithio-17α-ethynyl-5α-androstan-17β-ol,
2α,3α-epithio-18-methyl-5α-androstan-17β-ol,
2α,3α-epithio-17-methylene-5α-androstane,
2α,3α-epithio-5α-androtane-7α,17β-diol,
2α,3α-epithio-5α-androstane-6β,17β-diol,
2α,3α-epithio-17β-(1-cyclopentenyl)oxy-5α-androstane,
2α,3α-epithio-17β-(1-cyclohexenyl)oxy-5α-androstane,
2α,3α-epithio-17β-(1-methoxycyclopentyl)oxy-5α-androstane,
2α,3α-epithio-17β-(1-methoxycyclohexyl)oxy-5α-androstane,
2α,3α-epithio-17β-(1-methoxycycloheptyl)oxy-5α-androstane,
2α,3α-epithio-17β-(1-ethoxycyclopentyl)oxy-5α-androstane,
2α,3α-epithio-17β-(1-ethoxycyclohexyl)oxy-5α-androstane,
2α,3α-epithio-5α-androstan-17-one,
1α,2α-epithio-A-nor-5α-androstan-17β-ol,
2α,3α-epithio-17-methyl-D-homo-5α-androstan-17β-ol,
3β,4β-epithio-5α-androstan-17β-ol,
2α,3α-epithio-5α-androst-9(11)-en-17β-ol,
2α,3α-epithio-5α-androst-6-en-17β-ol,
2α,3α-epithio-5α-androst-6-en-17β-ol acetate,
16β,17β-epithio-4-androsten-3-one,
2α,3α-epithio-5α-estran-17β-ol,
2β,3β-epithio-5α-estran-17β-ol acetate,
2α,3α-epithio-5α-pregnan-20-one,
2α,3α-epithio-11,20-dioxo-17α-acetyloxy-5α-pregnane,
2α,3α-epithio-11,20-dioxo-17α-hydroxy-5α-pregnane,
2α,3α-epithio-17α-acetyloxy-5α-pregnan-20-one,
2α,3α-epithio-17α,21-dihydroxy-5α-pregnan-11,20-dione,
2α,3α-epithio-21-acetyloxy-17α-hydroxy-5α-pregnane-11,20-dione,
2α,3α-epithio-17α,21-dihydroxy-5α-pregnane-11,20-dione,
2α,3α-epithio-9α-fluoro-11β,17α-dihydroxy-5α-pregnan-20-one,
11α,12α-epithio-5α-pregnane-3β,20α-diol and
14β,15β-epithio-3β-hydroxy-5β,14β-card-20(22)-enolide.

6. An oily preparation according to claim 1, wherein the oil is a member selected from the group consisting of vegetable oil, alkyl ester of fatty acid, glyceride of fatty acid, and mixture thereof.

7. An oily preparation according to claim 6, wherein the vegetable oil is a member selected from the group consisting of sesame oil, olive oil, cottonseed oil, corn oil, peanut oil, castor oil, wheat germ oil, rice-bran oil, palm oil, sunflowerseed oil, linseed oil, and soya bean oil.

8. An oily preparation according to claim 6, wherein the alkyl ester of fatty acid is a member selected from the group consisting of methyl laurate, ethyl laurate, isopropyl laurate, butyl laurate, methyl myristate, ethyl myristate, isopropyl myristate, butyl myristate, isopropyl palmitate, butyl palmitate, amyl palmitate, isopropyl stearate, butyl stearate, decyl oleate, and diisopropyl adipate.

9. An oily preparation according to claim 6, wherein the glyceride of fatty acid is a member selected from the group consisting of glyceryl monocaprylate, glyceryl dicaprylate, glyceryl tricaprylate, glyceryl monoperalgonate, glyceryl diperalgonate, glyceryl triperalgonate, glyceryl monocaprate, glyceryl dicaprate, and glyceryl tricaprate.

10. An oily preparation comprising essentially 2α,3α-epithio-5α-androstan-17β-ol and sesame oil having a peroxide value of 0–2.5.

11. An oily preparation comprising essentially 2α,3α-epithio-5α-androstan-17β-ol propionate and sesame oil having a peroxide value of 0–2.5.

12. An oily preparation comprising essentially 2α,3α-epithio - 17β - (1-methoxycyclopentyl)oxy-5α-androstane and sesame oil having a peroxide value of 0–2.5.

13. An oily preparation comprising essentially 2α,3α-epithio-5α-androstan-17β-ol enanthate and sesame oil having a peroxide value of 0–2.5.

14. An oily preparation comprising essentially 2α,3α-epithio-17α-methyl-5α-androstan-17β-ol and sesame oil having a peroxide value of 0–2.5.

15. An oily preparation comprising essentially 2α,3α-epithio - 17α,21-dihydroxy-5α-pregnane-11,20-dione and sesame oil having a peroxide value of 0–2.5.

16. An oily preparation comprising essentially 2α,3α-epithio - 11,20 - dioxo - 17α-acetyloxy-5α-pregnane and sesame oil having a peroxide value of 0–2.5.

17. An oily preparation comprising essentially 2α,3α-epithio-5α-androst-6-en-17β-ol and sesame oil having a peroxide value of 0–2.5.

19. Process according to claim 18, wherein the oil has a peroxide value of 0–2.5.

20. Process according to claim 18, wherein the epithio-steroid is a member selected from the group consisting of androstane, pregnane, estrane, cholane and cholestane, having an epithio group at position 1,2; 2,3; 3,4; 4,5; 5,6; 6,7; 11,12; 14,15; 15,16; or 16,17 of the steroid nucleus and having optionally intact substituent(s) selected from the group consisting of lower alkyl, lower alkenyl, acyloxy, alkoxycycloalkyloxy, cycloalkenyloxy, hydroxy, oxo, ketal, carboxyl, ester, halogen, and unsaturated double bond.

21. Process according to claim 18, wherein the epithio-steroid is a 2α,3α-epithio-steroid.

22. Process according to claim 18, wherein the epithio-steroid is a member selected from the group consisting of:

2α,3α-epithio-5α-pregnane,
2α,3α-epithio-5α-estrane,
2α,3α-epithio-5β-cholane,
2α,3α-epithio-5β-cholanic acid methyl ester,
2α,3α-epithio-5α-cholestane,
2β,3β-epithio-5α-androstan-17β-ol,
2α,3α-epithio-5α-androstan-17β-ol,
2α,3α-epithio-5α-androstan-17β-ol acetate,
2α,3α-epithio-5α-androstan-17β-ol propionate,
2α,3α-epithio-5α-androstan-17β-ol valerate,
2α,3α-epithio-5α-androstan-17β-ol caprylate,
2α,3α-epithio-5α-androstan-17β-ol enanthate,
2α,3α-epithio-5α-androstan-17β-ol phenylpropionate, 2α,3α-epithio-5α-androstan-17β-ol benzoate,
2α,3α-epithio-2β-methyl-5α-androstane,
2α,3α-epithio-1α-methyl-5α-androstan-17β-ol,
2β,3β-epithio-1α-methyl-5α-androstan-17β-ol,
2α,3α-epithio-1α-methyl-5α-androstan-17β-ol acetate,
2α,3α-epithio-3β-methyl-5α-androstan-17β-ol,
2α,3α-epithio-7α-methyl-5α-androstan-17β-ol,
2α,3α-epithio-8β-methyl-5α-androstan-17β-ol,
2α,3α-epithio-17α-methyl-5α-androstan-17β-ol,
2α,3α-epithio-17α-ethyl-5α-androstan-17β-ol,
2α,3α-epithio-17α-vinyl-5α-androstan-17β-ol,
2α,3α-epithio-17α-ethynyl-5α-androstan-17β-ol,
2α,3α-epithio-18-methyl-5α-androstan-17β-ol,
2α,3α-epithio-17-methylene-5α-androstane,
2α,3α-epithio-5α-androstane-7α,17β-diol,
2α,3α-epithio-5α-androstane-6β,17β-diol,
2α,3α-epithio-17β-(1-cyclopentenyl)oxy-5α-androstane,
2α,3α-epithio-17β-(1-cyclohexenyl)oxy-5α-androstane,
2α,3α-epithio-17β-(1-methoxycyclopentyl)oxy-5α-androstane,
2α,3α-epithio-17β-(1-methoxycyclohexyl)oxy-5α-androstane,
2α,3α-epithio-17β-(1-methoxycycloheptyl)oxy-5α-androstane,
2α,3α-epithio-17β-(1-ethoxycyclopentyl)oxy-5α-androstane,
2α,3α-epithio-17β-(1-ethoxycyclohexyl)oxy-5α-androstane,
2α,3α-epithio-5α-androstan-17-one,
1α,2α-epithio-A-nor-5α-androstan-17β-ol,
2α,3α-epithio-17-methyl-D-homo-5α-androstan-17β-ol,
3β,4β-epithio-5α-androstan-17β-ol,
2α,3α epithio-5α-androst-9(11)-en-17β-ol,
2α,3α-epithio-5α-androst-6-en-17β-ol,
2α,3α-epithio-5α-androst-6-en-17β-ol acetate,
16β,17β-epithio-4-androsten-3-one,
2α,3α-epithio-5α-estran-17β-ol,
2β,3β-epithio-5α-estran-17β-ol acetate,
2α,3α-epithio-5α-pregnan-20-one,
2α,3α-epithio-11,20-dioxo-17α-acetyloxy-5α-pregnane,
2α,3α-epithio-11,20-dioxo-17α-hydroxy-5α-pregnane,
2α,3α-epithio-17α-acetyloxy-5α-pregnan-20-one,
2α,3α-epithio-17α,21-dihydroxy-5α-pregnan-11,20-dione,
2α,3α-epithio-21-acetyloxy-17α-hydroxy-5α-pregnane-11,20-dione,
2α,3α-epithio-17α,21-dihydroxy-5α-pregnane-11,20-one,
11α,12α-epithio-5α-pregnane-3β,20α-diol and
14β,15β-epithio-3β-hydroxy-5β,14β-card-20(22)-enolide.

23. Process according to claim 18, wherein the oil is a member selected from the group consisting of vegetable oil, alkyl ester of fatty acid, glyceride of fatty acid, and mixture thereof.

24. Process according to claim 23, wherein the vegetable oil is a member selected from the group consisting of sesame oil, olive oil, cottonseed oil, corn oil, peanut oil, castor oil, wheat germ oil, rice-bran oil, palm oil, sunflowerseed oil, linseed oil, and soya bean oil.

25. Process according to claim 23, wherein the alkyl ester of fatty acid is a member selected from the group consisting of methyl laurate, ethyl laurate, isopropyl laurate, butyl laurate, methyl myristate, ethyl myristate, isopropyl myristate, butyl myristate, isopropyl palmitate, butyl palmitate, amyl palmitate, isopropyl stearate, butyl stearate, decyl oleate, and diisopropyl adipate.

26. Process according to claim 23, wherein the glyceride of fatty acid is a member selected from the group consisting of glyceryl monocaprylate, glyceryl dicaprylate, glyceryl tricaprylate, glyceryl monoperalgonate, ylyceryl diperalgonate, glyceryl triperalgonate, glyceryl monocaprate, glyceryl dicaprate, and glyceryl tricaprate.

27. Process for preparing an oily preparation of 2α,3α-epithio-5α-androstan-17β-ol, which comprises adding said epithio-steroid to sesame oil having a peroxide value of 0–2.5 in an inert non-oxidative atmosphere.

28. Process for preparing an oily preparation of 2α,3α-epithio-5α-androstan-17β-ol propionate, which comprises adding said epithio-steroid to sesame oil having a peroxide value of 0–2.5 in an inert non-oxidative atmosphere.

29. Process for preparing an oily preparation of 2α,3α-epithio-17β-(1-methoxycyclopentyl)oxy - 5α - androstane, which comprises adding said epithio-steroid to sesame oil having a peroxide value of 0–2.5, in an inert non-oxidative atmosphere.

30. Process for preparing an oily preparation of 2α,3α-epithio-5α-androstan-17β-ol enanthate, which comprises adding said epithio-steroid to sesame oil having a peroxide value of 0–2.5, in an inert non-oxidative atmosphere.

31. Process for preparing an oily preparation of 2α,3α-epithio-17α-methyl - 5α - androstan-17β-ol, which comprises adding said epithio-steroid to sesame oil having a peroxide value of 0–2.5, in an inert non-oxidative atmosphere.

32. Process for preparing an oily preparation of 2α,3α-epithio-17α,21-dihydroxy - 5α - pregnane - 11,20 - dione, which comprises adding said epithio-steroid to sesame oil having a peroxide value of 0–2.5, in an inert non-oxidative atmosphere.

33. Process for preparing an oily preparation of 2α,3α-epithio-11,20-dioxo - 17α - acetyloxy-5α-pregnane, which comprises adding said epithio-steroid to sesame oil having a peroxide value of 0–2.5.

34. Process for preparing an oily preparation of 2α,3α-epithio-5α-androst-6-en-17β-ol, which comprises adding said epithio-steroid to sesame oil having a peroxide value of 0–2.5, in an inert non-oxidative atmosphere.

35. A medicament dosage unit form for human and veterinary use, containing an effective dosage amount of 1 or more epithio-steroids that decompose by the action of peroxide in oils which undergo autoxidation after exposure to air and as the essential stabilizing carrier therefor an oil having a low peroxide value.

References Cited
UNITED STATES PATENTS
3,670,080   6/1972   Hirata _____ 424—241

SHEP K. ROSE, Primary Examiner

U.S. Cl. X.R.

260—239.5, 410.7, 410.9, 428